United States Patent [19]

Carlin

[11] Patent Number: 4,972,878

[45] Date of Patent: Nov. 27, 1990

[54] FIRETRUCK VALVE

[76] Inventor: Jack Carlin, 4948 Ladera Sarina, Del Mar, Calif. 92014

[21] Appl. No.: 478,920

[22] Filed: Feb. 12, 1990

[51] Int. Cl.⁵ .................. F16K 31/50; F16K 3/16; F16K 3/32

[52] U.S. Cl. .................. 137/625.33; 251/203; 251/266

[58] Field of Search .................. 137/625.33; 251/203, 251/266

[56] References Cited

U.S. PATENT DOCUMENTS

| 2,734,529 | 2/1956 | Harrison | 137/625.33 X |
| 3,312,241 | 4/1967 | Bryant | 137/625.33 X |
| 4,150,693 | 4/1979 | Genevey et al. | 137/625.33 X |
| 4,541,608 | 9/1985 | Forester | 251/266 X |

FOREIGN PATENT DOCUMENTS

| 599476 | 6/1960 | Canada | 251/203 |
| 910076 | 1/1946 | France | 137/625.33 |

Primary Examiner—Arnold Rosenthal
Attorney, Agent, or Firm—Ralph S. Branscomb

[57] ABSTRACT

A high-volume, high-pressure valve is provided for attachment to the water inlet of a firetruck to receive the downstream end of the main supply hose connected to the fire hydrant. The heavy construction necessary to withstand the high pressures and rapid flow rate of water includes a gate which slides over a dam plate, with both the gate and the dam having slotted apertures which alternatively align and misalign as the gate slides over the dam to alternately open and close the dam.

7 Claims, 2 Drawing Sheets

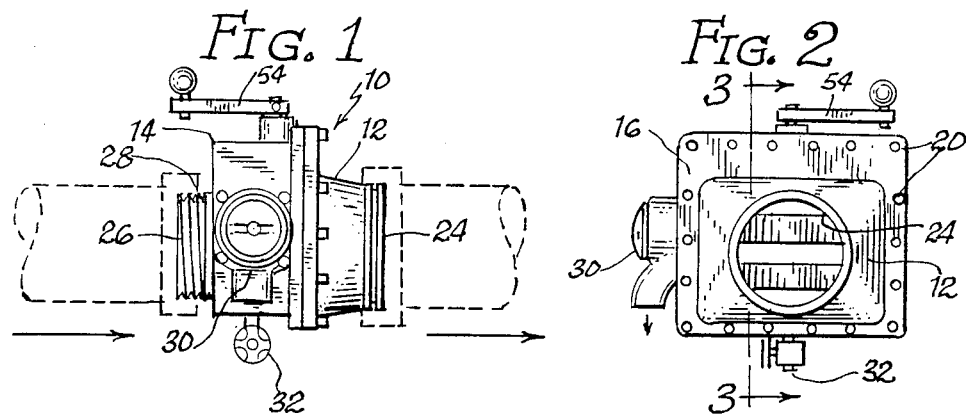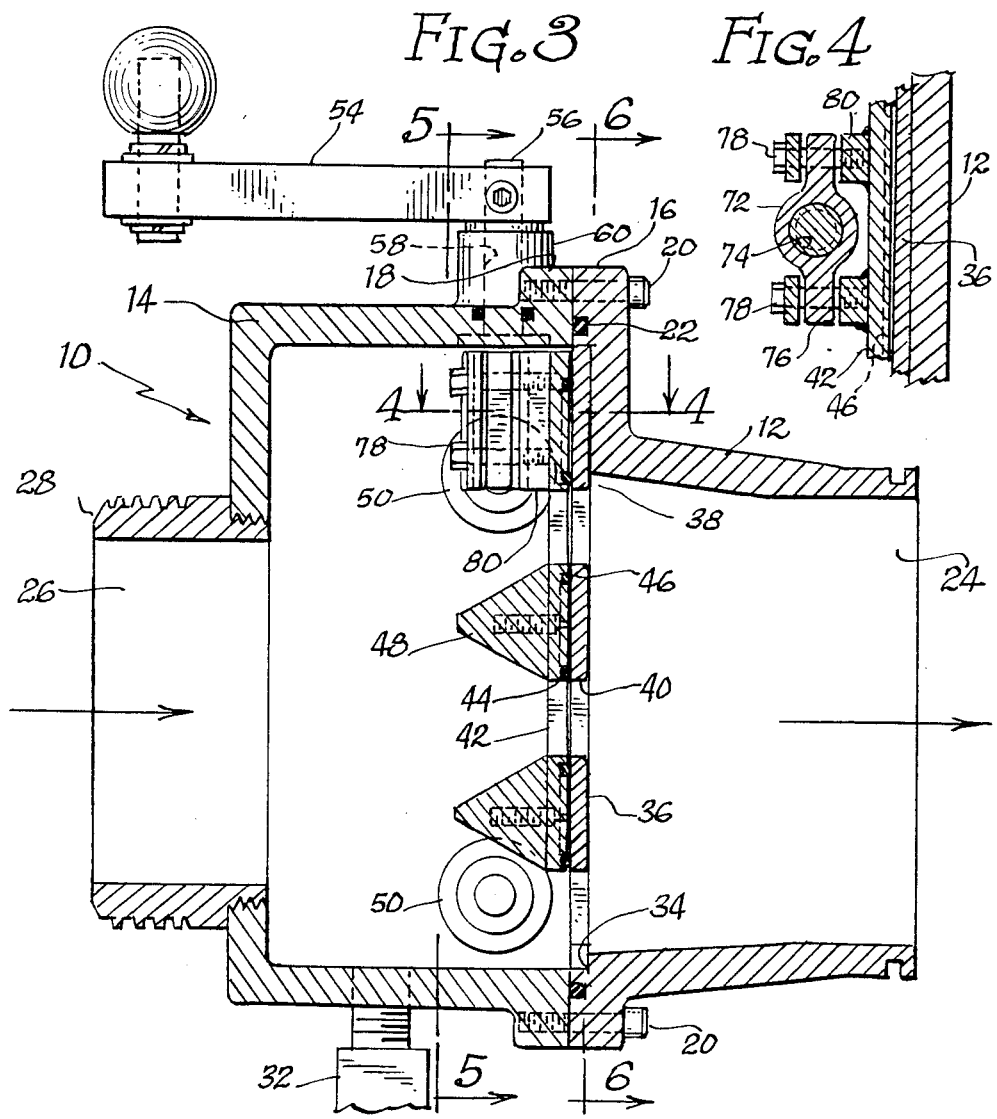

FIRETRUCK VALVE

BACKGROUND OF THE INVENTION

Firefighting techniques increasingly involve the use of larger diameter hoses and hose couplings to improve the delivery rate at the fire site. As technology in all areas have improved over the years, hoses, nozzles, and other firefighting equipment can be made lighter and stronger, and techniques improve. This makes it possible to deliver higher volumes of water which is one of the most crucial factors in effective fire fighting.

There are several large valves that are used on firetrucks, and in some instances on fire hydrants. The valve disclosed herein is one that is used on the firetruck at the inlet to control water that is flowing from the fire hydrant into the fire engine's fire pump. Previously, a valve of typical construction would have a hinged gate that would swing into seated position to stop the water flow. This type of valve is advantageous in that the gate can be moved completely clear of the valve throat to permit maximum use of the internal diameter of the valve.

However, with larger diameter hoses and fittings, and the accompanying increase in flow rate, larger valves are required so that a bottleneck in the system is not caused by the valve. As the valve gets larger, waterflow increases and the forces experienced by the valve are increased proportionately to the increase in the valve's interior surface area. These valves must be built to withstand tremendous forces, running to several hundred pounds per square inch, and could run close to a thousand pounds per square inch were it not for the pressure relief valve in worse-case water hammer situations.

For these reasons, the flap-type valve used on smaller hoses is not ideal for larger diameter hoses that are becoming more popular. 5" and even 6" diameter hoses are in use. The forces that these high-flow systems exert on the valve flap are tremendous as the valve is being opened or closed. There is a need for a high-volume, high-pressure valve utilizing a different mechanism than the hinged gate.

SUMMARY OF THE INVENTION

The instant invention fulfills the above stated need and comprises a valve having a flat dam plate against which a flat gate slides. The dam plate has several parallel slots, and the gate has a complimentary set of slots which will either align with the slots in the dam, or misalign to cover the slots in the dam to permit the valve to open and close. With this construction, there are no forces that are leveraged out of proportion on the internal parts of the valve mechanism.

The gate part of the valve is held against the dam surface by four rollers at the corners of the gate. The gate defines four ramp surfaces that the rollers ride on for at least part of the travel of the gate so that when the gate moves into the closed position, the ramps press harder against the rollers and force the gate harder into closed position. Conversely, when the gate is opened, the ramps relieve the pressure applied by the rollers so that the 0-rings between the gate and the dam are not unduly worn.

The gate is operated by an external crank having a shaft passing through the casing, and threadedly engage a bushing mounted to the gate, so that as the crank turns, the gate is moved back and forth across the face of the dam.

A significant additional advantage of the valve is that the nature of the valve construction is such that it can quite easily be enlarged to adapt to increasingly large hoses that will almost certainly be coming into general use in the near future.

BRIEF DESCRIPTION OF THE DRAWING

FIG. 1 is a side elevation view showing the overall appearance of the valve;

FIG. 2 is an end elevation view as the valve appears from the end which couples to the firetruck;

FIG. 3 is a section taken along line 3—3 FIG. 2;

FIG. 4 is a section taken along line 4—4 FIG. 3;

DETAILED DESCRIPTION OF THE PREFERRED EMBODIMENT

Figure 5:
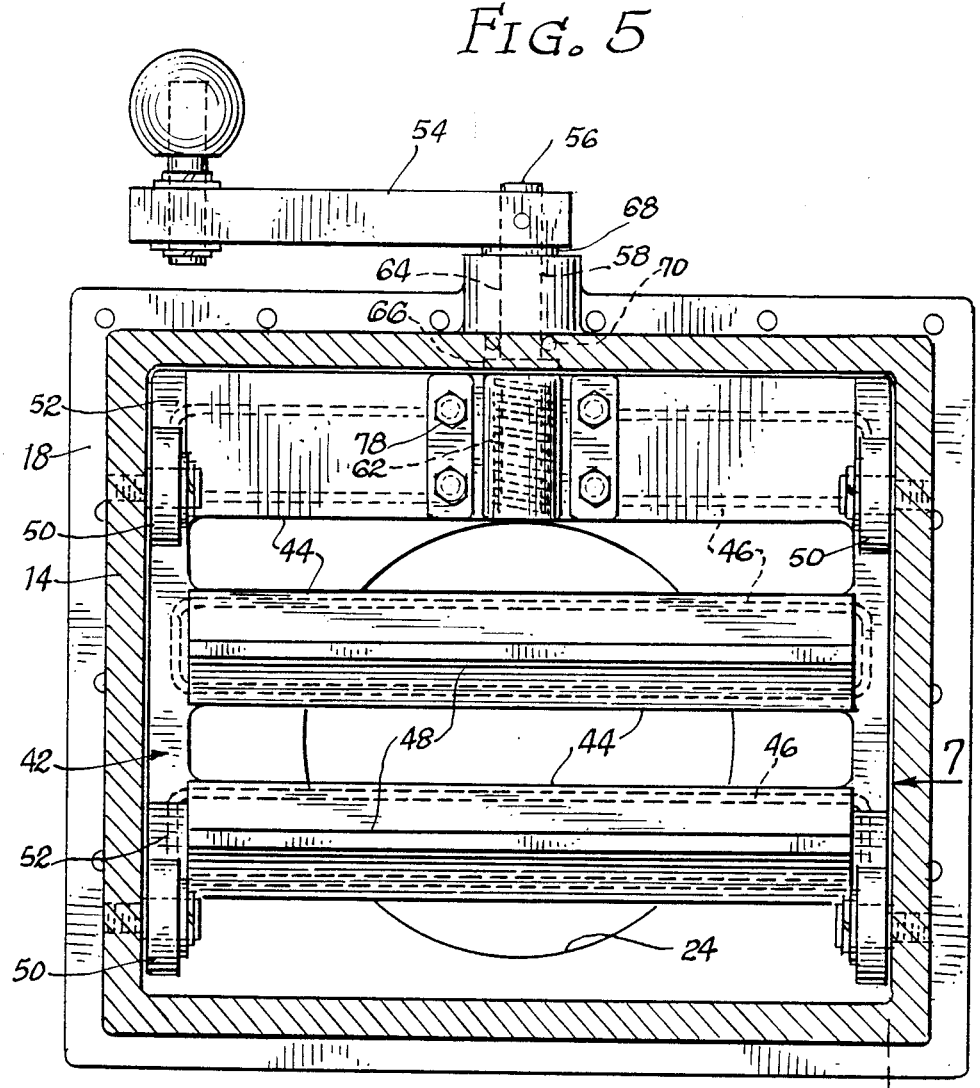
FIG. 5 is a section taken along line 5—5 FIG. 3.
Figure 6:
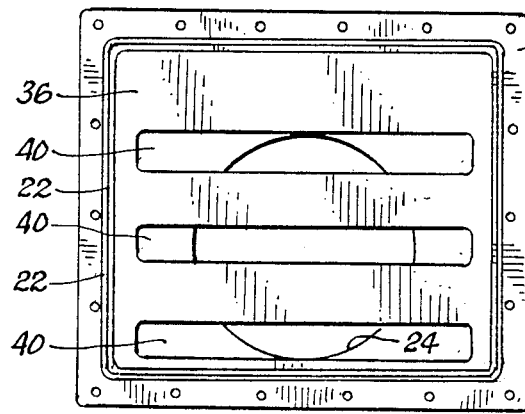
FIG. 6 is a section taken along line 6—6 FIG. 3.

The valve has a casing pen which is comprised of a downstream shell 12 and an upstream shell 14. The shells each have a flange 16 and 18 respectively which mate as is shown in FIG. 3 and are clamped together by bolts 20 and sealed with an 0-ring 22.

The downstream shell defines an outlet 24 which is configured to be engaged by the standard coupling on a firetruck. The upstream shell 14 defines an inlet 26 having an adaptive coupling 28 so that it will fit either four- or four-and-a-half-inch hose couplings. Clearly, larger couplings could be accommodated, but at present in most instances even five inch and six inch diameter hoses have couplings that are no larger than four and a half inches. The outlet 24, however, may be five or six inches.

The upstream shell 14 also mounts a pressure relief valve 30 and an air bleed valve 32. These two valves are standard on all valves of this nature. The air bleed valve is needed to exhaust the water-air mixture in the hose when it is first connected to a fire hydrant, and before the main valve of this invention is opened. When this sputtering stops and a stream of pure water is seen at the air bleed valve, it is closed and the main valve is then opened. The pressure relief valve is needed to limit pressure spikes resulting from water hammer. In worst-case situations, these spikes can deliver pressure back to the system of eight times the normal water pressure, which may be up to eight hundred pounds. A shock wave of this magnitude could destroy parts of the city water system or damage fire fighting equipment, so the pressure relief has an adjustable pressure maximum which ordinarily would not or could not be set higher than about three hundred pounds per square inch.

Turning to the interior of the valve casing pen, the downstream shell defines a peripheral shoulder of 34 as shown in FIG. 3, which seats the dam plate 36, which is retained by welding 38 around its entire periphery. The dam plate, being welded to the downstream shell around its entire perimeter, not only defines a basis for starting and stopping water flow, but regidifies the casing considerably by forming a connecting web across the vulnerable central part of the casing chamber.

The dam has three slotted apertures 40 which provide the only passageways for the water to get from the inlet to the outlet of the valve. Sliding across the upstream face of the dam is the gate 42 which is provided with its own slots 44 best seen in FIGS. 3 and 5, which correspond to the slots 40 in the dam. As shown in FIG. 3, the gate can be moved to align the slots, permitting free water flow when the valve is opened. However, when the valve is moved down from its position in FIG. 3, the slots will misalign and the valve will be shut. Each of the slotted openings of the gate are ringed with an 0-ring as shown in FIG. 3. The 0-rings could alternatively be installed on the dam side of the interface. Fairing strips 48 are either unitary with the gate if it is cast, or they can be bolted on as shown. If bolted, a tough plastic such as Delrin would work well. The fairing strips streamline the upstream end of the valve as much as possible to minimize turbulence.

Figure 7:
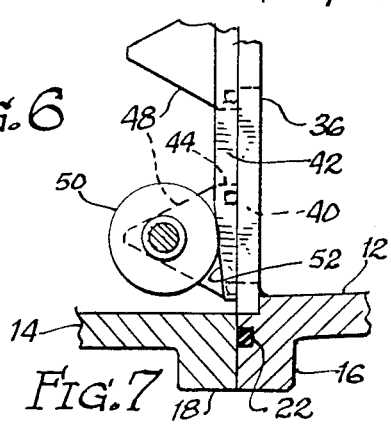
FIG. 7 is a section taken along line 7—7 FIG. 5.

As the gate moves up and down as shown in FIG. 3, it is held against the dam face by rollers 50 which are bolted into the sides of the casing. These rollers can likewise be made of Delrin, which defines such a low-friction surface that no bearings are needed at the roller axes. As detailed in FIG. 7, the lower end of the plate where it engages beneath the rollers is ramped at 52, and corresponding ramps are defined in the equivalent positions under the upper rollers. As the plate slides downward into its closed position, it can be seen from the detail of FIG. 7 that the rollers apply increasing pressure against the gate to insure that a tight seal is formed between the gate and the dam.

The valve is operated by means of a crank 54 which has a shaft 56 which passes down a bore 58 in a boss 60 at the top of the casing. The shaft is threaded at 62 in its lower reaches, and the upper part is smooth as indicated at 64. The diameter of the threaded portion is somewhat larger than the smooth portions, and a washer 66 slipped over the smooth portion rests atop the threads and prevents the shaft from moving upward vertically. The washer of 68 between the casing boss and the crank prevents downward motion so that the shaft is captured against vertical movement. It is sealed with an 0-ring 70.

At the top center of the gate is mounted a butterfly-shaped bushing 72 detailed in FIG. 4. The central threaded bore 74 engages the threaded lower end of the shaft, and the wings 76 are captured by bolts 78 which screw into nuts 80 welded onto the face of the gate. As can be seen in FIG. 4, the bushing has some clearance on the bolts so that the gate is not constrained from small movement toward and away from the dam so that it is assured of seating properly.

It can be seen that the gate construction is extremely strong. There is no leveraging action possible against hinged gates. The casing is preferably made of cast stainless steel, but it could also be made from welded stainless steel plates, which would make the unit boxier but would simplify the construction of valves with couplings 28 which were downwardlydirected as this construction would not require a second mold.

In use, the valve is connected to the firehose through a coupling shown on the right side in FIG. 1, and to the fire hydrant hose to the left of FIG. 1. Because of the heavy-gauge stainless steel construction of all pressure-withstanding parts, the valve should be virtually indestructible in conditions considerably worse than worst-case conditions experienced in fighting fires.

I claim:

1. A fluid valve comprising:
   (a) a casing having an inlet and an outlet and defining a passageway between said inlet and outlet;
   (b) a dam passing across said passageway to block fluid flow therethrough but having a plurality of dam apertures therethrough to pass fluid;
   (c) a gate mounted in said casing to be slidable across said dam and having a plurality of gate apertures that alternately substantially align with said dam apertures and substantially completely misalign therewith as said gate slides from an unopened mode to a shut mode;
   (d) value operating means accessible from externally of said casing to move said gate between its open and shut modes;
   (e) said dam defining a substantially planar upstream surface and said gate being slideable on said surface; and
   (f) said casing mounting at least one roller oriented to bear against said gate holding same against said dam and being rotatable as said gate moves between siad open and shut modes.

2. A fluid valve according to claim 1 and including a resilient sealing mans mounted around the apertures of at least one of said plurality of apertures and said gate defines a ramp surface to bear against said roller such that as said gate moves into the closed mode, said ramp inclines, forcing said gate harder against said dam to compress said sealing means to form a secure watertight seal between said gate and dam.

3. A fluid valve comprising:
   (a) a casing having an inlet and an outlet and defining a passageway between said inlet and outlet;
   (b) a dam passing across said passageway to block fluid flow therethrough but having a plurality of dam apertures therethrough to pass fluid;
   (c) a gate mounted in said casing to be slidable across said dam and having a plurality of gate apertures that alternately substantially align with said dam apertures and substantially completely misalign therewith as said gate slides from an unopened mode to a shut mode;
   (d) value operating means accessible from externally of said casing to move said gate between its open and shut modes;
   (e) a bushing with a threaded bore mounted on said gate, and said valve operating means comprising a crankoperated threaded shaft passing through said casing and engaging said threaded bore.

4. A fluid valve according to claim 3 wherein said bushing is butterfly-shaped with said bore being central and longitudinally oriented, and having wings captured by mounts connected to said gate.

5. A fluid valve according to claim wherein said wings are mounted with clearance from said mounts such that said gate has some freedom of movement against and away from said dam to permit said gate to seat with the full force of the fluid upstream of said gate.

6. A fluid valve according to claim 3 wherein said threaded shaft has an unthreaded portion of thickness less than that of the threaded portion, and said casing has a snug-fitting bore through which said unthreaded portion passes to the exterior of said casing, and said threaded portion is larger in diameter than said snug bore to prevent said shaft from floating in the outward direction in said bore.

7. A fluid valve comprising:
   (a) a casing having an inlet and an outlet and defining a passageway between said inlet and outlet;

(b) a dam passing across said passageway to block fluid flow therethrough but having a plurality of dam apertures therethrough to pass fluid;

(c) a gate mounted in said casing to be slidable across said dam and having a plurality of gate apertures that alternately substantially align with said dam apertures and substantially completely misalign therewith as said gate slides from an unopened mode to a shut mode;

(d) valve operating means accessible from externally of said casing to move said gate between its open and shut modes;

(e) said dam defining a substantially planar upstream surface and said gate being slideable on said surface;

(f) said dam being a plate orthogonally oriented to fluid flow, and said plate and the cross section of said casing being substantially rectangular and said apertures being slotshaped and each extending substantially across the width of said casing; and (g) said casing comprises an upstream shell with a hose coupling mounted therein and a downstream shell adapted to mount to a firetruck inlet, said shells each being substantially rectangular and having a phalanged lip which lips mate against one another and are bolted together.

* * * * *